(12) United States Patent
Compton et al.

(10) Patent No.: US 10,521,147 B2
(45) Date of Patent: Dec. 31, 2019

(54) DEVICE RESERVATION STATE SYNCHRONIZATION IN DATA MIRRORING

(71) Applicant: International Business Machines Corporation, Armonk, NY (US)

(72) Inventors: Scott B. Compton, Hyde Park, NY (US); Matthew R. Craig, Sahuarita, AZ (US); Clint A. Hardy, Tucson, AZ (US); Matthew J. Kalos, Tucson, AZ (US); Carol S. Mellgren, Tucson, AZ (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,302

(22) Filed: Nov. 30, 2017

(65) Prior Publication Data

US 2019/0163373 A1    May 30, 2019

(51) Int. Cl.
*G06F 3/06*        (2006.01)
(52) U.S. Cl.
CPC .............. *G06F 3/065* (2013.01); *G06F 3/067* (2013.01); *G06F 3/0619* (2013.01); *G06F 3/0665* (2013.01)
(58) Field of Classification Search
CPC ......... G06F 3/065; G06F 3/0665; G06F 3/067
See application file for complete search history.

(56) References Cited

U.S. PATENT DOCUMENTS

| | | | |
|---|---|---|---|
| 6,304,980 B1 | 10/2001 | Beardsley et al. |
| 6,446,176 B1 | 9/2002 | West et al. |
| 7,225,307 B2 | 5/2007 | Micka et al. |
| 7,350,114 B2 | 3/2008 | Moody, II et al. |
| 7,647,525 B2 | 1/2010 | Lecrone et al. |
| 7,882,316 B2 | 2/2011 | Boyd et al. |
| 7,979,396 B1 | 7/2011 | Krishnamurthy et al. |
| 8,335,899 B1 | 12/2012 | Meiri et al. |
| 8,341,364 B2 | 12/2012 | Coronado et al. |
| 8,694,828 B2 | 4/2014 | Nelson et al. |

(Continued)

FOREIGN PATENT DOCUMENTS

| | | |
|---|---|---|
| EP | 2299361 | 3/2011 |
| WO | 2008020310 | 2/2008 |
| WO | 2016098150 | 6/2016 |

OTHER PUBLICATIONS

S. Das, et al., "Storage Management for SAP and Oracle: Split Mirror Backup / Recovery With IBM's Enterprise Storage Server (ESS)", International Business Machines Corporation, Total 70 pages.

(Continued)

*Primary Examiner* — Edward J Dudek, Jr.
(74) *Attorney, Agent, or Firm* — William K. Konrad; Konrad, Raynes, Davda and Victor LLP

(57) ABSTRACT

One general aspect of device reservation state synchronization in accordance with the present description, device reservation management logic ensures synchronization of reservation states of primary and secondary volumes of a mirror relationship in the event of a change in the state of the mirroring relationship such as achieving full data synchronization between the volumes. Other features and aspects may be realized, depending upon the particular application.

24 Claims, 7 Drawing Sheets

(56) References Cited

U.S. PATENT DOCUMENTS

| | | |
|---|---|---|
| 8,782,358 B2 | 7/2014 | Broido et al. |
| 8,819,362 B1 | 8/2014 | Duprey et al. |
| 8,949,183 B2 | 2/2015 | Hildebrand et al. |
| 9,483,204 B2 | 11/2016 | Schnapp et al. |
| 10,282,258 B1 | 5/2019 | Compton et al. |
| 2004/0205312 A1 | 10/2004 | Zlotnick et al. |
| 2004/0254964 A1 | 12/2004 | Kodama et al. |
| 2005/0038968 A1 | 2/2005 | Iwamura et al. |
| 2005/0071708 A1 | 3/2005 | Bartfai et al. |
| 2005/0273647 A1* | 12/2005 | Furuumi ............... G06F 3/0617 714/5.1 |
| 2006/0005074 A1 | 1/2006 | Yanai et al. |
| 2006/0020753 A1 | 1/2006 | Cochran et al. |
| 2007/0079062 A1* | 4/2007 | Miyawaki ............. G06F 3/061 711/112 |
| 2009/0063892 A1* | 3/2009 | Abdulvahid ........ H04L 67/1095 714/4.4 |
| 2013/0086349 A1* | 4/2013 | Kaiya ................. G06F 3/0619 711/164 |
| 2015/0135003 A1 | 5/2015 | Cota-Robles et al. |
| 2015/0350318 A1* | 12/2015 | Van Assche ........ H04L 67/1095 709/202 |
| 2019/0163576 A1 | 5/2019 | Compton et al. |
| 2019/0220370 A1 | 7/2019 | Compton et al. |

OTHER PUBLICATIONS

US Patent Application, dated Nov. 30, 2017, for U.S. Appl. No. 15/828,288 (18.719), invented by Scott B. Compton et al., Total 40 pages.

US Patent Application, dated Nov. 30, 2017, for U.S. Appl. No. 15/828,311 (18.747), invented by Scott B. Compton et al., Total 56 pages.

Lists of Related Applications, for U.S. Appl. No. 15/828,302 (18.746) pp. 2, dated Nov. 30, 2017.

Office Action, dated Jun. 28, 2019, for U.S. Appl. No. 15/828,288, invented by Scott B. Compton et al., Total 21 pages.

US Patent Application, dated Mar. 26, 2019, for U.S. Appl. No. 16/365,621, filed Mar. 26, 2019, invented by Scott B. Compton et al., Total 68 pages.

Preliminary Amendment, dated Mar. 26, 2019, for U.S. Appl. No. 16/365,621, filed Mar. 26, 2019, invented by Scott B. Compton et al., Total 16 pages.

List of Patents and Applications Treated as Related, dated Jul. 25, 2019, Total 2 pages.

Notice of Allowance, dated Dec. 26, 2018, for U.S. Appl. No. 15/828,311, invented by Scott B. Compton et al., Total 12 pages.

Response to Office Action, dated Sep. 30, 2019, for U.S. Appl. No. 15/828,288, invented by Scott B. Compton et al., Total 15 pages.

* cited by examiner

DEVICE RESERVATION STATE SYNCHRONIZATION IN DATA MIRRORING

BACKGROUND OF THE INVENTION

1. Field of the Invention

The present invention relates to a computer program product, system, and method for synchronizing device reservation states in data synchronous mirroring between primary and secondary data storage devices.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Accordingly, data from a host to be stored in the data storage system is typically directed to a primary device at a local site and then replicated to one or more secondary devices which may be geographically remote system from the primary data storage device. One primary device can have multiple secondary relationships in which data directed to a primary device is replicated to multiple secondary devices.

The process of replicating, that is, copying or mirroring data over to the secondary data storage device can be setup in either a synchronous or asynchronous relationship between the primary data storage device and the secondary data storage device. In a synchronous relationship, any updates to the primary data storage device are typically synchronized with the secondary data storage device, that is, successfully copied over to the secondary data storage device, before the primary data storage device reports to the host that the data storage input/output operation has been successfully completed. Thus, in a synchronous mode, an I/O operation which performed a write operation to the primary data storage device is not considered complete until the mirror operation is completed, that is, it is not complete until the update data has been successfully replicated to the secondary data storage device. Should the mirror operation fail such that the update is not successfully mirrored to the secondary storage, the host may be notified that the update operation was not successfully completed.

Storage systems may alternatively employ an asynchronous relationship between a primary data storage device and a secondary data storage device, particularly if the secondary data storage device is geographically distant from the primary data storage device. In an asynchronous relationship, successful updates to the primary data storage device are typically reported to the host as a successful storage input/output operation without waiting for the update to be replicated to the secondary data storage device. As a result, the host need not wait for the data replication to the secondary data storage device to be completed, and the performance of the host system may be enhanced accordingly.

As the name suggests, in an asynchronous relationship, the data of primary data storage device and the secondary data storage device may not be fully synchronized at any one time. Thus, data stored on the secondary data storage device typically lags that stored in the primary data storage device. Accordingly, new data stored on a primary data storage device may not be stored on the secondary data storage device for an interval of time such as 3-5 seconds, for example.

Selected primary data storage devices such as a volume or logical unit number (LUN), may be reserved for exclusive use by a particular host for I/O data requests. Such reservation of a device for exclusive use of the reservation holding host is often referred to as "hardware serialization." Although secondary data storage devices typically are not reserved directly by a host, one or more secondary data storage devices may be in effect be reserved by association with the reservation of a primary data storage device held by the host.

A mirrored pair of primary and secondary data storage devices may be managed by primary-secondary role swap logic such that if a failure occurs in connection with the primary data storage device, a device role swap can be performed, averting the need to report the error to the I/O requestor. Instead, the host may redirect the I/O request to the secondary data storage device. This swap technique, when employed by the z/OS operating system, is referred to as "HyperSwap."

SUMMARY

One general aspect of device reservation state synchronization in accordance with the present description, is directed to relationship state detection logic detecting a change in relationship state of a synchronous mirror relationship between a primary device controlled by a primary storage controller, and at least one secondary device controlled by at least one secondary storage controller. Reservation state synchronization logic, in response to detecting a change in relationship state, determines if a reservation state of the primary device is synchronized with respect to a reservation state of a secondary device of the synchronous mirror relationship, and synchronizes the reservation states of the primary device and the at least one secondary device if determined to be out of synchronization. In one embodiment, the relationship state detection logic reports the change in state of the synchronous mirror relationship to a host after synchronizing reservation states of the primary and secondary devices to ensure that the reservation states of the primary and secondary devices are synchronized prior to reporting the change of relationship state to the host.

In another aspect, determining if a reservation state of the primary device is synchronized with respect to a reservation state of at least one secondary device includes determining the reservation state of the primary device and determining the reservation state of the at least one secondary device and comparing the determined reservation states of the primary and the at least one secondary device to determine if the determined reservation states of the primary and the at least one secondary device match. If the determined reservation state of the primary device matches the determined reservation state of the at least one secondary device, the reservation states of the primary and the at least one secondary device are determined to be synchronized. If the determined reservation state of the primary device does not match the determined reservation state of the at least one secondary device, the reservation states of the primary and the at least one secondary device are determined to be out of synchronization.

In yet another aspect, relationship state detection logic in detecting a change in relationship state detects completion of data synchronization of the primary device and the at least one secondary device, and synchronizing the reservation states includes overriding any existing reservation state of the at least one secondary device to match the reservation state of the primary device prior to reporting completion of data synchronization to full duplex status. In one embodiment, synchronizing the reservation states includes if the reservation state of the at least one secondary device is determined to be reserved and the reservation state of the primary device is determined to be not reserved, releasing the reservation state of the at least one secondary device to a not reserved state. In another embodiment, synchronizing the reservation states includes, if reservation state of the primary device is determined to be reserved to a first host and the reservation state of the at least one secondary device is determined to be reserved to a second host different from the first host, overriding the reservation of the at least one secondary device to the second host, and reserving the secondary device to the first host so that the reservation state of the secondary device becomes reserved to the same host as that of the reserved primary device. In yet another embodiment, synchronizing the reservation states includes, if reservation state of the primary device is determined to be reserved to a first host and the reservation state of the at least one secondary device is determined to be not reserved to any host, reserving the at least one secondary device to the first host so that the reservation state of the at least one secondary device becomes reserved to the first host.

Another aspect is directed to device reservation logic propagating a reservation state from the primary device to the at least one secondary device so that the at least one secondary device assumes the same reservation state as the primary device upon completion of the propagation. Reservation state synchronization logic suspends other reservation state changing until the reservation state propagation is complete.

Implementations of the described techniques may include hardware, a method or process, or computer software on a computer-accessible medium. Other features and aspects may be realized, depending upon the particular application.

DETAILED DESCRIPTION

Figure 1:
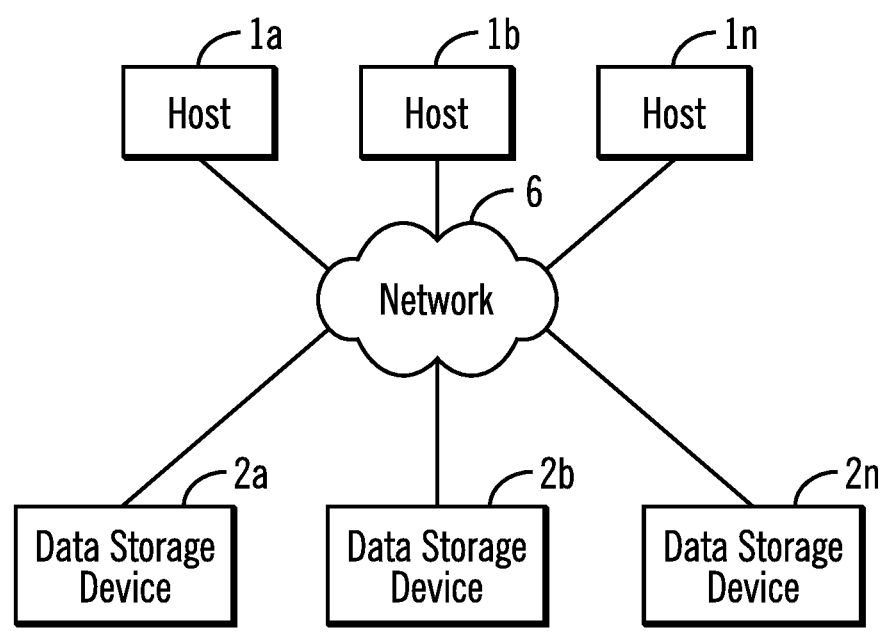
FIG. 1 illustrates an embodiment of a computing environment employing device reservation state synchronization in accordance with the present description.

Reservation by a single host of the primary and secondary volumes in a synchronous mirroring relationship can facilitate maintaining data serialization, that is, consistency of data on both the primary and secondary volumes in a synchronous mirroring relationship. In some systems, a device such as a primary volume controlled by a primary storage controller may be reserved for exclusive use on behalf of a particular host for input/output (I/O) operations of that host. In a synchronous mirror relationship, there may be multiple secondary volumes, each of which may be controlled by a secondary storage controller, such that the primary volume is in a one to many relationship, which is also referred to as a multi-target relationship.

The reservation of the primary volume on behalf of a host which holds the reservation, is typically initiated by the host and is maintained by the primary storage controller which controls the reserved primary volume. Since one primary device can have multiple secondary relationships, the reservation of a primary device can be extended by propagation to all secondary devices of a synchronous mirror relationship as described in copending application Ser. No. 15/828,311, entitled "Data Reservation State Preservation In Data Mirroring". Thus, the reservation of the primary device may be propagated by the primary storage controller to each secondary storage controller of the synchronous multi-target mirror relationship such that both the primary volume controlled by a primary storage controller and the secondary volume or volumes controlled by associated secondary storage controllers, may in effect both be reserved on behalf of the same host.

Reservation by a single host of both the primary and secondary volumes in a synchronous single or multi-target mirroring relationship can facilitate maintaining data serialization, that is, consistency, of data on both the primary and secondary volumes. However, it is appreciated herein that changes in the state of the mirroring relationship between the primary and secondary volumes may result in the reservation states of the primary and secondary volumes going out of synchronization.

For example, should the mirroring relationship between the primary and secondary volumes be suspended, the reservation states of the primary and secondary volumes of the suspended mirroring relationship may go out-of-sync. Thus, upon suspension of the mirroring relationship, the primary storage controller may release the reservation of the primary volume, leaving the secondary volume still reserved to the original host. This out-of-sync relationship between the reservation states of the primary and secondary volumes may lead to a variety of problems for host systems. For example, if the secondary volume remains reserved to a host which no longer has a reservation of the corresponding primary volume of the suspended mirroring relationship, other hosts which require access to the secondary volume may be denied that access by continuation of a no longer appropriate reservation of the secondary volume by the original host.

It is appreciated that an out-of-sync relationship between the reservation states of the primary and secondary volumes may lead to other problems for host systems. For example, a host may expect to have exclusive access to volumes for input/output operations but due to the reservations states going out-of-sync, the host does not. This situation can be particularly troublesome for disaster recovery in which data serialization is to be maintained on the volumes of the mirroring relationship in a variety of error scenarios, configurations and recovery policies.

In one aspect of device reservation state synchronization for devices in a data mirroring relationship in accordance with the present description, device reservation management logic is provided to ensure synchronization of reservation states of the primary and secondary volumes of the relationship in the event of changes in the states of the mirroring relationship between the volumes. As used herein, the term "synchronization" of reservation states includes states in which the reservation states of the primary and secondary volumes match.

In one embodiment, device reservation management logic includes relationship state detection logic which detects a change in relationship state of a synchronous mirror relationship between a primary volume controlled by a primary storage controller, and at least one secondary volume controlled by at least one secondary storage controller. A reservation state synchronization logic of the device reservation management logic, in response to detection of a change in relationship state, determines if a reservation state of the primary volume is synchronized with respect to a reservation state of a secondary volume, and synchronizes the reservation states of the primary volume and the at least one secondary volumes if they are determined to be out of synchronization.

For example, in establishing (or re-establishing) a mirror relationship between a primary volume and a secondary volume in a known peer-to-peer remote copy system, there is typically a period of time during which the data on the two volumes is synchronized (or re-synchronized) prior to notifying the host that the synchronous mirror relationship is active. Once the synchronization (or re-synchronization) is complete, the mirror relationship is said to become "full-duplex" and in prior data storage systems, any connected host is notified of this change of relationship state. However, in one aspect of the present description, reservation state synchronization logic ensures that the reservation states of the primary and secondary volumes are synchronized prior to the host being notified of the completion of the data synchronization between the volumes of the mirror relationship.

For example, in an environment that is configured to propagate hardware reservations from the primary to the secondary, the reservation state synchronization logic ensures that the reservation states of the primary and secondary volumes are synchronized prior to the host being informed of the relationship state change to full duplex. In one embodiment, synchronizing the reservation states may result in any existing reservation on the secondary volume being overridden prior to the mirror relationship going to the full-duplex state. Thus, for example, in cases where the primary volume is reserved to a particular host but the secondary volume is reserved to a different host, or the secondary volume is not reserved to any host, a reservation request propagated to the secondary for the secondary volume may be immediately granted to the host that currently holds the reservation on the primary volume. As a result, the host can be assured that data serialization will be preserved on the volumes of the mirror relationship due to the full-duplex state which includes synchronization of the reservation states of the primary and secondary volumes as both reserved to that host.

In another aspect of the present description, in synchronizing reservation states of primary and secondary volumes in a mirror relations, if the secondary volume is reserved but the primary volumes is not reserved, reservation state synchronization logic releases the reservation on the secondary volume. In this manner, the reservation states of both the primary and secondary volumes will match, that is, the reservation states of the volumes will all be in the released state.

A system of one or more computers may be configured for device reservation state synchronization in accordance with the present description, by virtue of having software, firmware, hardware, or a combination of them installed on the system that in operation causes or cause the system to perform device reservation management for overcoming communication path disruptions operations. For example, one or more computer programs may be configured to perform device reservation state synchronization by virtue of including instructions that, when executed by data processing apparatus, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

In the illustrated embodiment, a mirror relationship identifies a source storage location, such as a primary storage location, and a target storage location, such as a secondary storage location, in which data stored at the source storage location is to be replicated or otherwise copied to the target storage location. Thus, as used herein, a source storage location and a target storage location are storage locations related by a mirror relationship.

Furthermore, as used herein, the term "device" in the context of a device reservation, refers to a storage location containing one or more units of data storage such as one or more volumes, logical unit numbers (LUNs), cylinders, tracks, segments, extents, or any portion thereof, or other unit or units of data suitable for transfer or storage. Thus, a source device and the associated target device which may be reserved on behalf of a host, may each be a storage volume. However, it is appreciated that a source device and a target device unit may each be of a size other than a volume, for example. It is further appreciated that a device which may be reserved on behalf of a host may be a physical device or a virtual device.

Implementations of the described techniques may include hardware, a method or process, or computer software on a computer-accessible medium. FIG. 1 illustrates an embodiment of a computing environment employing device reservation preservation in accordance with the present description. A plurality of hosts 1a, 1b . . . 1n may submit Input/Output (I/O) requests to one or more data storage systems 2a, 2b, . . . 2n over a network 3 to access data stored by the data storage systems. The hosts 1a, 1b . . . 1n may be separate physical devices or may be virtual devices implemented using assigned resources of partitions of a server, for example. In a similar manner, the data storage systems 2a, 2b . . . 2n may be separate physical devices or may be virtual devices implemented using assigned resources of partitions a server, for example.

Figure 2:
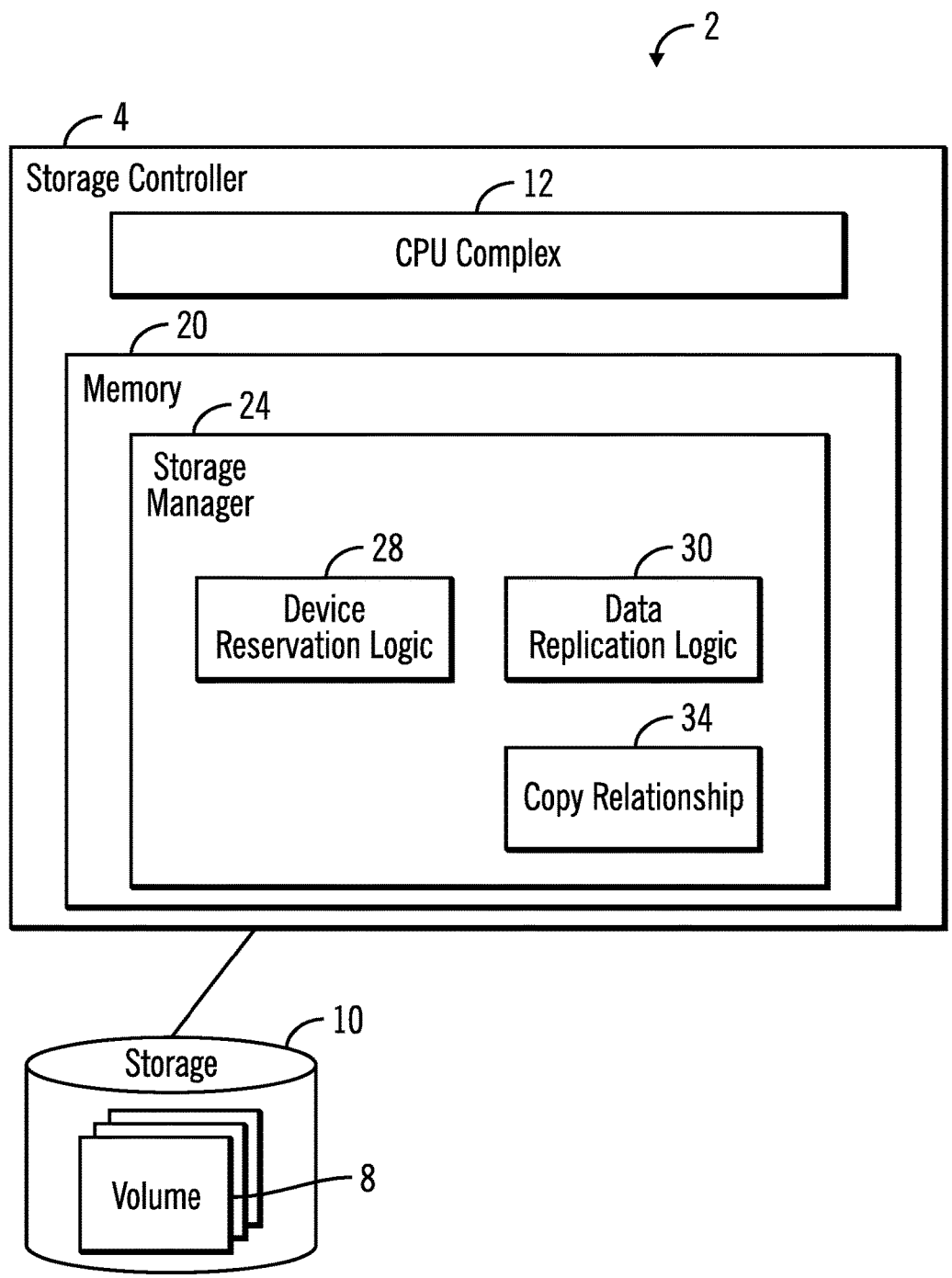
FIG. 2 illustrates an example of a data storage system for use with a host and employing device reservation state synchronization in accordance with the present description.
Figure 3:
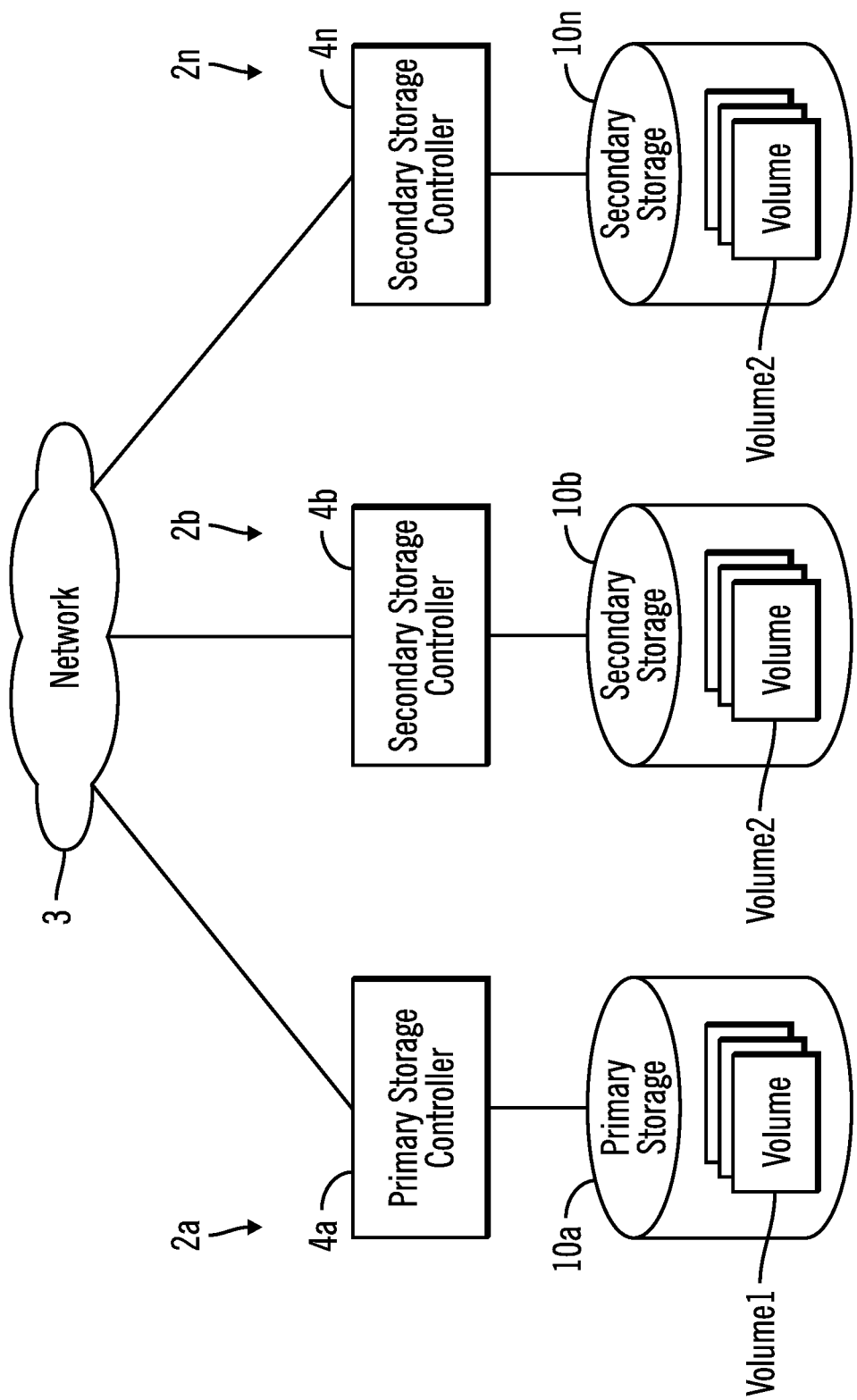
FIG. 3 illustrates an example of a storage system having a primary data storage system and one or more secondary data storage systems for use in a system employing device reservation state synchronization in accordance with the present description.

FIG. 2 shows an example of a data storage system such as the system 2, for example, in greater detail. Thus, each data storage system 2 (FIG. 2), 2a, 2b . . . 2n (FIG. 1) includes a storage controller or control unit 4 (FIG. 2), 4a (FIG. 3), 4b . . . 4n which accesses data at volumes 8 (e.g., Logical Unit Numbers, Logical Devices, Logical Subsystems, etc.) in storage represented by one or more storage drives 10, 10a, (FIG. 3), 10b (FIG. 3). Each storage controller 4, 4a, 4b . . . 4n includes a CPU complex 12 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 3), 4b . . . 4n further has a memory 20 that includes a storage manager 24 for managing storage operations including writing data to or reading data from an associated storage drive 10, 10a (FIG. 3), 10b, . . . 10n respectively, in response to an I/O data request from the host holding the reservation of a device such as a storage volume of one of the data storage systems 2 (FIG. 2), 2a (FIG. 3), 2b, . . . 2n. The storage operations managed by the storage manager 24 further include data replication operations from a reservable primary volume1 (FIG. 3) of a primary data storage system such as the data storage system 2a, for example, to a reservable secondary volume2 at one or more secondary data storage systems such as the secondary data storage systems 2b, . . . 2n, for example.

As explained in greater detail below, the storage manager 24 includes device reservation logic 28 which in one aspect of the present description, ensures synchronization of reservation states of the primary and secondary volumes of the relationship in the event of changes in the state of the mirroring relationship between the volumes. In the illustrated embodiment, the storage manager 24 including the device reservation logic 28 is depicted as software stored in the memory 20 and executed by the CPU complex 12. However, it is appreciated that some or all of the logic functions of the storage manager 24 may be implemented as hardware, software, firmware or combinations of one or more thereof, depending upon the particular application.

The storage manager 24 further includes a data replication logic 30 (FIG. 2) of the storage manager 24 which is configured to synchronously generate copies of the primary volume1 (FIG. 3) of the primary data storage system 2a as a secondary volume2 (FIG. 3) of the secondary data storage systems 2b . . . 2n. A primary-secondary pair of reservable volumes, volume1, volume2 are in an synchronous copy or mirror relationship 34 such that updates to the primary volume1 are synchronously mirrored to each secondary volume2.

One or more copy relationships 34, which may be maintained by the data replication logic 30 for the primary and secondary storage controllers 4a, 4b, . . . 4n (FIG. 3) associate primary storage locations in the primary storage drive 10a and corresponding secondary storage locations in each of the secondary storage drives 10b, . . . 10n of the mirror relationship, such that updates to the primary storage drive 10a locations are mirrored, that is, copied to the corresponding secondary storage drive 10b, . . . 10n locations. For example, source storage locations in a primary storage volume1 (FIG. 3) of storage drive 10a may be synchronously mirrored in a mirror data replication operation to target storage locations of a secondary volume2 of the storage drive 10b pursuant to a mirror copy relationship 34 (FIG. 2). Similarly, source storage locations in the primary storage volume1 (FIG. 3) of storage drive 10a may be synchronously mirrored in a mirror data replication operation to additional target storage locations of a secondary volume2 of the storage drive 10n of each of the other secondary data storage systems as represented by the secondary data storage system 2n, pursuant to a mirror copy relationship 34 (FIG. 2).

In the illustrated embodiment, a copy relationship 34 comprises a peer-to-peer synchronous mirror relationship for a pair of storage locations in which updates to the primary (source) storage locations of the mirror relationship 34 are synchronously mirrored to the secondary (target) storage locations of the mirror relationship 34. It is appreciated that other types of copy relationships may be established, depending upon the particular application.

In the configuration illustrated in FIG. 3, the storage controller 4a and the data storage drive 10a have been configured as a primary storage control unit and the primary storage, respectively, of a primary data storage system 2a. Similarly, the storage controller 4b and its data storage drive 10b have been configured as a secondary storage control unit and a secondary storage, respectively, of a secondary data storage system 2b. Hence, in the configuration depicted in FIG. 3, the storage controller 4a will be referred to as a primary storage controller or control unit 4a, and the data storage drive 10a will be referred to as a primary storage drive 10a. Similarly, the storage controller or control unit 4b will be referred to as a secondary storage controller or control unit 4b and the data storage drive 10b will be referred to as a secondary data storage drive 10b. In this embodiment, there may be multiple secondary data storages such that a copy relation can be in a one to many relationship, which is also referred to as a multi-target relationship. Thus, additional storage controllers as represented by the storage controller 4n are referred to herein as a secondary storage controllers or control units 4n and the data storage drive 10n is referred to as a secondary data storage drive 10n. As used herein, a partner storage controller is a storage controller which controls a volume or device of a synchronous mirror relationship.

In a particular copy relationship, the source unit is often referred to as the primary and the target unit is often referred to as the secondary. Replication relationships are defined between storage units of the primary data storage drive 10a and the secondary data storage drives 10b . . . 10n. Notwithstanding a reference to the data storage drive 10a as "primary" and the data storages 10b . . . 10n as "secondary," particular storage units of the data storages 10a, 10b, . . . 10n may play both a primary (or source role) and a secondary (or target role) depending upon the particular copy relationship.

In data replication systems, data is typically maintained in volume pairs, comprising a primary volume such as volume1 (FIG. 3), for example, in a primary storage system and a corresponding secondary volume such as volume2, for example, in a secondary storage system that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary devices. A primary device such as volume1, for example, may be in a one to many mirror multi-target relationship with multiple secondary devices, such as volume2 of the secondary data storage systems 2b, . . . 2n.

The primary storage controller 4a is located at a first site and the secondary storage controller 4b is located at a second site which may be geographically or functionally remote from the first site. Thus, in this example, the first site may be at a local site and the second site may be at geographically remote sites separated by a short or long geographical distance from the local site and from each other. Alternatively, the local and remote site may be relatively close such as in different buildings in the same general geographical location, in different rooms of the same building, in different machines in the same room, or in different portions or partitions of the same machine, of the network 3.

The storage manager 24 (FIG. 2) in one embodiment may transfer data from the primary storage drive 10a (FIG. 3) to a secondary storage drive 10b, . . . 10n in tracks. As used herein, the term track may refer to a physical or virtual track of a disk storage unit but may also reference to other units of data configured in the storage drive 10, 10a, 10b, . . . 10n such as a bit, byte, word, segment, page, block (such as a Logical Block Address (LBA)), cylinder, volume, logical unit number (LUN) etc., which may be a part of a larger grouping of data units, such as a volume, logical device, etc.

In one embodiment, the storage devices 10, 10a, 10b, . . . 10n may be comprised of one or more sequential access storage devices, such as hard disk drives and magnetic tape or may include non-sequential access storage devices such as solid state drives (SSD), for example. Each storage device 10, 10a, 10b, . . . 10n may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

One mode of the data replication logic 30 managing the copy relationships, may be implemented with synchronous copy operations, such as a peer-to-peer remote copy (PPRC) program modified as appropriate in accordance with present description. The described operations may be implemented with other programs such as other copy programs or other global recovery programs modified as appropriate in accordance with present description.

The system components 1a, 1b . . . 1n, 4, 4a, 4b, . . . 4n, 10, 10a, 10b, . . . 10n are connected to the network 3 which enables communication among these components. Thus, the network 3 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 1a, 1b, . . . 1n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 4:
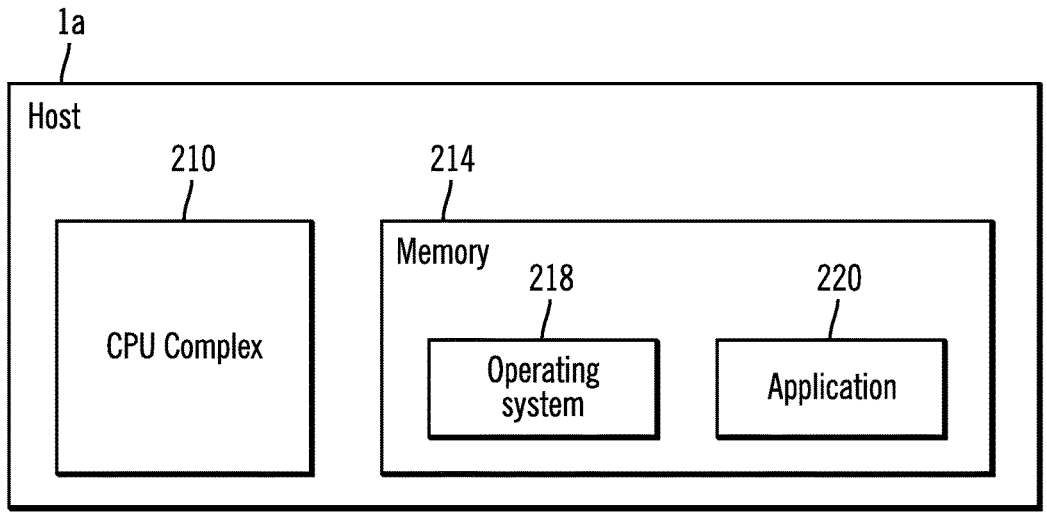
FIG. 4 illustrates an example of a host for use in a system employing device reservation state synchronization in accordance with one aspect of the present description.

A typical host as represented by the host 1a of FIG. 4 includes a CPU complex 210 and a memory 214 having an operating system 218 and an application 220 that cooperate to read data from and write data updates to the primary storage drive 10a (FIG. 3) or secondary storage drive 10b, . . . 10n via a storage controller 4a, 4b, . . . 4n, respectively. An example of a suitable operating system is the z/OS operating system. It is appreciated that other types of operating systems may be employed, depending upon the particular application.

Figures 5A, 5B, 5C:
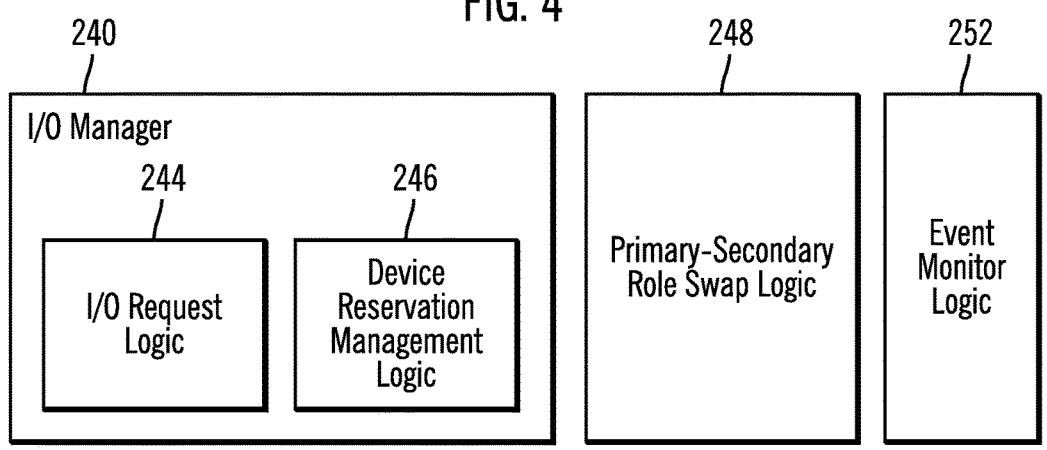
FIGS. 5A-5C illustrate logic elements of the host of FIG. 4.

In the illustrated embodiment, each host such as the host 1a (FIG. 4) includes an input/output (I/O) manager 240 (FIG. 5A) which may be a part of the host operating system 218 or an application 220 (or both). Thus, in one embodiment, the I/O manager 240 is depicted as software stored in the memory 214 and executed by the CPU complex 210. However, it is appreciated that the logic functions of the I/O manager 240 may be implemented as hardware, software, firmware or combinations of one or more thereof, depending upon the particular application.

The I/O manager 240 (FIG. 5A) includes I/O request logic 244 which issues in response to a read or write operation requested by an I/O requestor such as an application 220, an I/O data request to a storage controller 4a for a primary device, for example, to read data from the selected primary device, or write data to the selected primary device. The I/O manager 240 of the host 1a further includes device reservation management logic 246 configured to request reservation of a selected primary devices for exclusive use by the host 1a for I/O data requests. Such reservation of a device for exclusive use of the reservation holding host is often referred to as "hardware serialization." The status of a particular device as reserved to a particular host, may be indicated by suitable data structures maintained by the reservation management logic 246 of the reservation holding host, and suitable data structures maintained by the storage controller which controls the particular device reserved to a particular host.

In the illustrated embodiment, each host such as the host 1a (FIG. 4) further includes primary-secondary role swap logic 248 (FIG. 5B) which may be a part of the host operating system 218 or an application 220 (or both). Examples include a HyperSwap Manager in a z/OS Hyper-Swap and Geographically Dispersed Parallel Sysplex (GDPS). Thus, in one embodiment, primary-secondary role swap logic 248 is depicted as software stored in the memory 214 and executed by the CPU complex 210. However, it is appreciated that the logic functions of primary-secondary role swap logic 248 may be implemented as hardware, software, firmware or combinations of one or more thereof, depending upon the particular application.

The primary-secondary role swap logic 248 of the host is configured to selectively swap primary and secondary roles of the primary and secondary devices, respectively in the event such a swap is needed to maintain data input/output and replication operations. For example, if monitor logic 252 (FIG. 5C) of the host determines that the primary data storage system 2a (FIG. 3) having the volume1 of a primary-secondary pair of volumes, volume1, volume2 reserved to the host 1a, has been lost to the host 1a due to a hardware or software failure of the primary data storage system 2a, for example, the primary-secondary role swap logic 248 of the host is configured to selectively swap primary and secondary roles of the data storage systems 2a, 2b so that the data storage system 2b which was originally the secondary data storage system, is re-assigned the role of the primary data storage system.

More specifically, if data of the data storage system 2a (FIG. 3) is being synchronously mirrored (using, for example, peer to peer remote copy, (PPRC)), the data storage system 2a is considered a primary data storage system and can have one or more secondary data storage systems such as the data storage systems 2b . . . 2n. A synchronously mirrored device pair of the primary and secondary data storage systems 2a, 2b, is managed by the primary-secondary role swap logic 248 which can if appropriate, selectively perform a swap operation, which is referred to as "HyperSwap" when employed by the z/OS operating system. Accordingly, if a failure occurs to the primary data storage system 2a, a device role swap can be selectively performed by the primary-secondary role swap logic 248. The swap can obviate reporting an error to the I/O requestor. Instead, the host can re-issue the I/O data request to the secondary data storage system 2b upon successfully reassigning the data storage system 2b as the primary data storage system.

Figure 6:
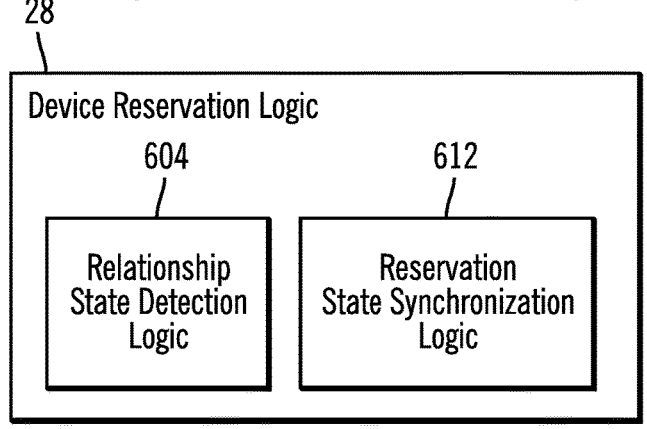
FIG. 6 depicts an embodiment of device reservation logic for a storage controller employing device reservation state synchronization in accordance with one aspect of the present description.

FIG. 6 depicts an example of a device reservation logic 28 for device reservation state synchronization in accordance with one embodiment of the present description. The device reservation logic 28 is configured to ensure synchronization of reservation states of the primary and secondary volumes of the relationship in the event of changes in the states of the mirroring relationship between the volumes. In this example, the device reservation logic 28 includes relationship state detection logic 604 which is configured to detect a change in relationship state of a synchronous mirror relationship between a primary volume controlled by a primary storage controller, and at least one secondary volume controlled by at least one secondary storage controller. A reservation state synchronization logic 612 of the device reservation management logic 28, is configured to, in response to detection of a change in relationship state, determine if a reservation state of the primary volume is synchronized with respect to a reservation state of a secondary volume, and synchronize the reservation states of the primary volume and the at least one secondary volumes if they are determined to be out of synchronization.

Figure 7:
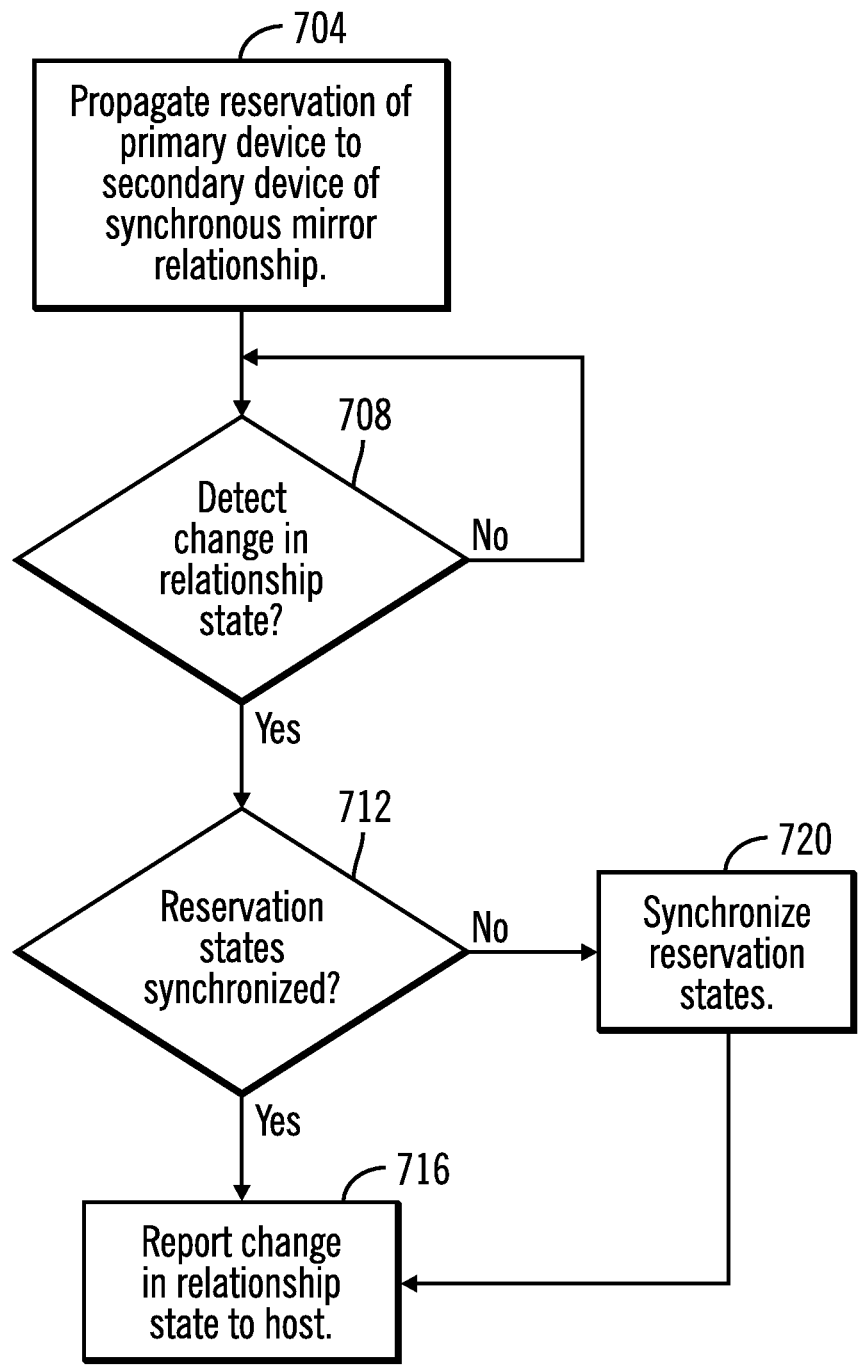
FIG. 7 depicts an example of operations of device reservation logic for a storage controller employing device reservation state synchronization in accordance with one aspect of the present description.

FIG. 7 depicts one example of operations of the device reservation logic 28 in one aspect of reservation state synchronization in accordance with the present description. In this example, reservation of a primary device such as a primary volume such as volume1 (FIG. 3), for example, has been propagated (block 704, FIG. 7) by the device reservation logic 28 to each secondary device volume2 (FIG. 3) of a single or multi-target synchronous mirror relationship such that both the primary device and the secondary devices of the mirror relationship may initially be in a reserved state, reserved to a host such as the host 1a. However, it is appreciated herein that the reservation state of one or more of the primary and secondary devices may change due to various factors such that the reservation states of the primary and secondary devices may go out-of-sync. As described below, reservation state synchronization in accordance with the present description can ensure synchronization of the reservation states and obviate various problems that out-of-sync states might otherwise have caused.

Accordingly, in the example of FIG. 7, relationship state detection logic 604 (FIG. 6) detects (block 708, FIG. 7) a change in relationship state of a synchronous mirror relationship between a primary volume controlled by a primary storage controller, and at least one secondary volume controlled by at least one secondary storage controller. One example of a such a change in relationship state is completion of data synchronization from a primary device to a secondary device of a synchronous mirror relationship such that the primary and secondary devices have achieved full duplex status or state. Before the change to full duplex status is reported to the host to which the primary and secondary devices were initially reserved, reservation state synchronization logic 612 (FIG. 6) of the device reservation management logic 28, in response to detection (block 708, FIG. 7) of a change in relationship state, determines (block 712) whether the reservation state of the primary device is synchronized with respect to a reservation state of the secondary device of the full duplex pair of devices.

One example of determining if a reservation of the primary device is synchronized with respect to the reservation state of a secondary device of the full duplex pair includes determining the reservation state of the primary device and determining the reservation state of the at least one secondary device and comparing the determined reservation states of the primary and the secondary device of the pair to determine if the determined reservation states of the primary and the secondary devices match. For example, if the reservation states of the primary and secondary devices of the pair are determined (block 712) in association with the pair achieving full duplex state (block 708, FIG. 7) to both be reserved to the same host, or both released from prior reservations, the reservation states of the pair are considered to be synchronized in this example. In one aspect of the present description, if the reservation states of the primary and secondary devices of the pair are determined (block 712) in association with the pair achieving full duplex state (block 708, FIG. 7) to be synchronized, the change to full duplex state of the mirror relationship is reported (block 716) to the host. Thus, the relationship state detection logic 604 (FIG. 6) is configured to report (block 716, FIG. 7) the change in state of the synchronous copy relationship to a host after the reservation state synchronization logic 612 (FIG. 6) confirms the synchronization of the reservation states of the primary and secondary devices to ensure that the reservation states of the primary and secondary devices are synchronized prior to reporting the change of relationship state to the host.

Conversely, if the determined (block 712) that the reservation state of the primary device does not match the determined reservation state of the secondary device of the pair, the reservation states of the primary and the secondary devices of the pair are determined to be out of synchronization. For example, if the reservation state of one of the devices of the primary-secondary pair is determined (block 712) in association with the pair achieving full duplex state (block 708, FIG. 7) to be reserved to a host, but the other device of the pair is determined to be released or reserved by a different host, the reservation states of the pair are considered to not be synchronized in this example.

As previously described, an out-of-sync relationship between the reservation states of the primary and secondary volumes of a full duplex pair may lead to a variety of problems for host systems. For example, if the secondary volume remains reserved to a host which no longer has a reservation of the corresponding primary volume of a suspended mirroring relationship, other hosts which require access to the secondary volume may be denied that access by continuation of a no longer appropriate reservation of the secondary volume by the original host. In another example, a host may expect to have exclusive access to the volumes of the full duplex pair for input/output operations but due to the reservations states going out-of-sync, the host does not. This situation can be particularly troublesome for disaster recovery in which data serialization is to be maintained on the volumes of the mirroring relationship in a variety of error scenarios, configurations and recovery policies.

Accordingly, in one aspect of the present description, if the reservation states of the primary and secondary devices of the pair are determined (block 712) in association with the pair achieving full duplex state (block 708, FIG. 7) to not be synchronized, the reservation states of the primary and secondary devices of the pair are synchronized (block 720) before the change to full duplex state of the mirror relationship is reported (block 716) to the host. Thus, the relationship state detection logic 604 (FIG. 6) is configured to report (block 716, FIG. 7) the change in state of the synchronous copy relationship to a host after the reservation state synchronization logic 612 (FIG. 6) synchronizes (block 720, FIG. 7) the reservation states of the primary and secondary devices to ensure that the reservation states of the primary and secondary devices are synchronized prior to reporting the change of relationship state to the host. As explained in greater detail below, ensuring that the reservation states of the primary and secondary devices of a pair are synchronized (block 720) before a change of relationship state is reported (block 716) to the host, may obviate various problems.

Figure 8:
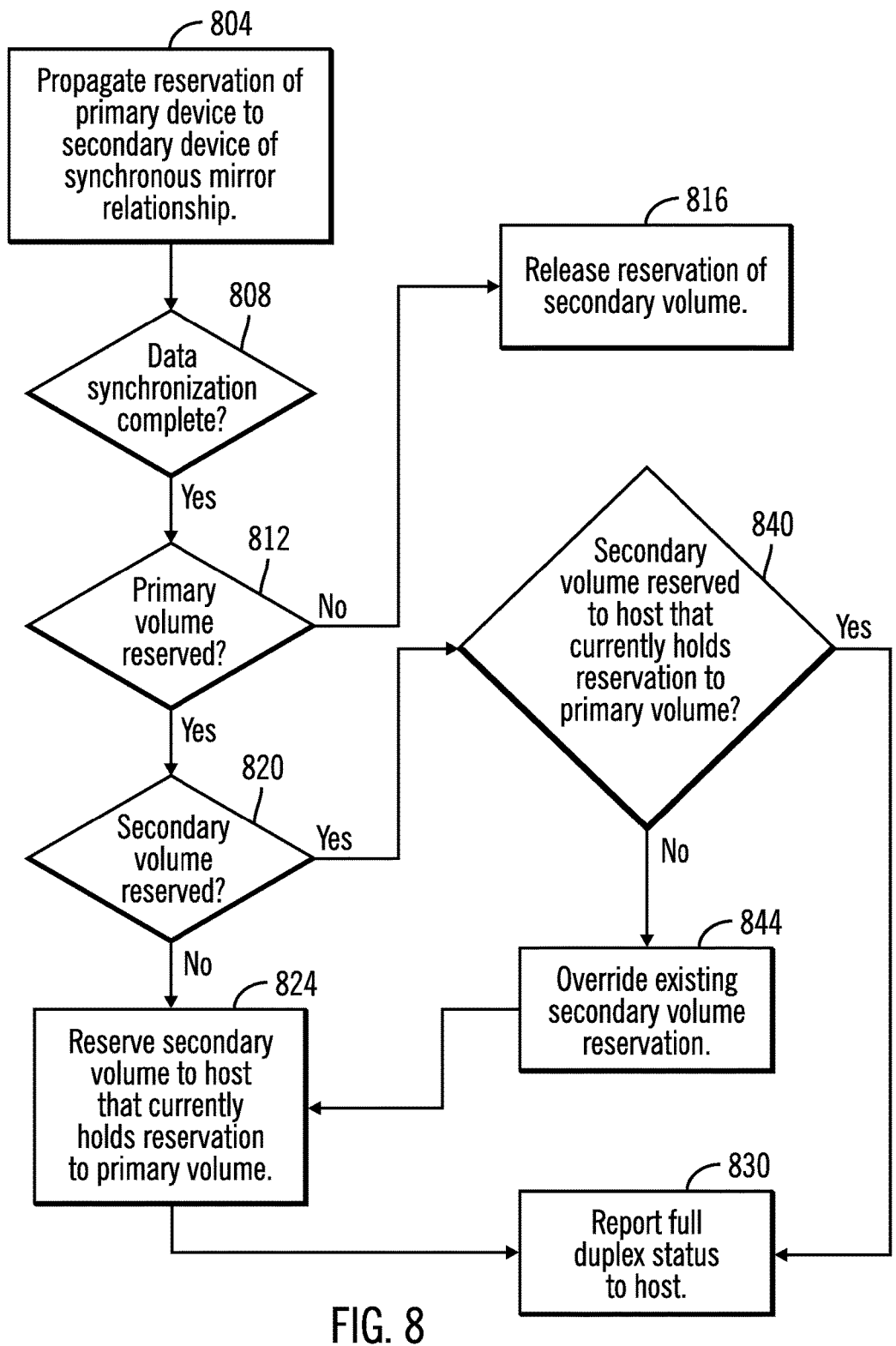
FIG. 8 depicts another example of operations of device reservation logic for a storage controller employing device reservation state synchronization in accordance with one aspect of the present description.

FIG. 8 depicts in greater detail one example of synchronizing reservation states which have been determined to be out of synchronization in association with a change in relationship state.

Although described in connection with a change in relationship state to a full duplex state, it is appreciated that other changes in relationship state may also trigger reservation state synchronization in accordance with the present description. In addition, although reservation state synchronization is described in connection with reserved, not reserved and released reservation states, it is appreciated that reservation state synchronization in accordance with the present description may apply to other reservation states.

FIG. 8 depicts a more detailed example of operations of the device reservation logic 28 in one aspect of reservation state synchronization in accordance with the present description. In this example, reservation of a primary device such as a primary volume such as volume1 (FIG. 3), for example, has been propagated (block 804, FIG. 8) to each secondary device volume2 (FIG. 3) of a single or multi-target synchronous mirror relationship such that both the primary device and the secondary devices of the mirror relationship are initially in a reserved state to a host such as the host 1a. However, in a manner similar to that described above in connection with FIG. 7, it is appreciated herein that the reservation state of one or more of the primary and secondary devices may change due to various factors such that the relationship states of the primary and secondary devices may go out-of-sync. As described below, reservation state synchronization in accordance with the present description can ensure synchronization of the reservation states and obviate various problems that out-of-sync states might otherwise have caused.

Accordingly, in the example of FIG. 8, relationship state detection logic 604 (FIG. 6) detects (block 808, FIG. 7) whether data synchronization from a primary device to a secondary device of a synchronous mirror relationship has completed such that the primary and secondary devices have achieved full duplex status or state. For example, in establishing (or re-establishing) a mirror relationship between a primary volume and a secondary volume in a known peer-to-peer remote copy system, there is typically a period of time during which the data on the two volumes is synchronized (or re-synchronized) prior to notifying the host that the synchronous mirror relationship is active. Once the data synchronization (or re-synchronization) is complete, the mirror relationship is said to become "full-duplex." In prior data storage systems, any connected host is notified of this change of relationship state at that time. However, as explained in greater detail below, in one aspect of the present description, before the change to full duplex status is reported to the host to which the primary and secondary devices were initially reserved, reservation state synchronization logic 612 (FIG. 6) of the device reservation management logic 28, is configured to override any existing reservation state of the secondary device of the primary-secondary pair to match the reservation state of the primary device of the pair prior to reporting completion of data synchronization to full duplex status.

Thus, in the example of FIG. 8, the reservation state synchronization logic 612 (FIG. 6) of the device reservation management logic 28, is configured to, in response to detection (block 808, FIG. 8) of completion of data synchronization of the primary-secondary pair, determine (block 812) whether the reservation state of the primary device of the pair is the reserved state. The reservation state synchronization logic 612 (FIG. 6) is further configured to release (block 816, FIG. 8) any reservation of the secondary device of the primary-secondary pair, if it is determined (block 812) that the reservation state of the primary device is not a reserved state such that any prior reservation of the primary device had been released. Thus, if the reservation state of the secondary device of the pair is determined to be reserved and the reservation state of the primary device is determined to be not reserved, the reservation state of secondary device is released (block 816, FIG. 8) to a not reserved state to match that of the primary device of the primary-secondary pair. Similarly, if the reservation state of the secondary device of the pair is determined to already be not reserved and the reservation state of the primary device is determined to be not reserved, the reservation state of secondary device is maintained (block 816, FIG. 8) in the not reserved state to match that of the primary device of the pair. In this manner, the reservation state synchronization logic 612 synchronizes (block 816) the reservation states of the primary and secondary volumes of the primary-secondary pair to match such that both are in a released (or not reserved) state in response to a determination (block 812) that the reservation state of the primary device is not a reserved state.

Conversely, if it is determined (block 812) that the reservation state of the primary device is a reserved state such that the primary device is reserved to the host, the reservation state synchronization logic 612 (FIG. 6) of the device reservation management logic 28, is configured to determine (block 820) whether the reservation state of the secondary device of the primary-secondary pair is the reserved state. Thus, if the reservation state of the primary device is determined (block 812, FIG. 8) to be reserved to a host and the reservation state of the secondary device of the pair is determined (block 820) to be not reserved to any host, the reservation state synchronization logic 612 (FIG. 6) of the device reservation management logic 28, is configured to reserve (block 824, FIG. 8) the secondary device of the primary-secondary pair so that the reservation state of the secondary device becomes reserved to the same host as that of the reserved primary device. The relationship state detection logic 604 (FIG. 6) is further configured to report (block 830, FIG. 8) the change in state to full duplex state of the synchronous copy relationship to the common host after the reservation state synchronization logic 612 (FIG. 6) synchronizes (block 824, FIG. 8) the reservation states of the primary and secondary devices to ensure that the reservation states of the primary and secondary devices are synchronized prior to reporting the change of relationship state to the host.

If it is determined (block 820) that the reservation state of the secondary device of the pair is in the reserved state, the reservation state synchronization logic 612 (FIG. 6) of the device reservation management logic 28, is further configured to determine (block 840, FIG. 8) whether the secondary volume of the primary-secondary pair is reserved to the same host that holds the reservation to the primary device of the pair. In this manner, the reservation state synchronization logic 612 is configured to determine if the reservation states of the primary and secondary devices are synchronized. For example, if it is determined (block 840, FIG. 8) that the same host holds reservations to both the primary and secondary devices of the primary-secondary pair, the reservation states of the primary and secondary devices of the pair are considered to be synchronized. As a result, the relationship state detection logic 604 (FIG. 6) is further configured to report (block 830, FIG. 8) the change in state to full duplex state of the synchronous copy relationship to the host after the reservation state synchronization logic 612 (FIG. 6) ensures (block 840, FIG. 8) that the reservation states of the primary and secondary devices are synchronized prior to reporting the change of relationship state to the host.

Conversely, if reservation state synchronization logic 612 (FIG. 6) of the device reservation management logic 28, determines (block 840, FIG. 8) that the secondary volume of the primary-secondary pair is reserved to a host different from host that holds the reservation to the primary device of the pair, the reservation state synchronization logic 612 (FIG. 6) is further configured to override (block 844, FIG. 8) any existing reservation to other hosts, and reserve (block 824, FIG. 8) the secondary device of the primary-secondary pair so that the reservation state of the secondary device becomes reserved to the same host as that of the reserved primary device. In this manner, the reservation state synchronization logic 612 (FIG. 6) synchronizes (blocks 844, 824) the reservation states of the primary and secondary devices of the pair. As described above, the relationship state detection logic 604 (FIG. 6) reports (block 830, FIG. 8) the change in state to full duplex state of the synchronous copy relationship to the host after the reservation state synchronization logic 612 (FIG. 6) synchronizes (block 824, FIG. 8) the reservation states of the primary and secondary devices to ensure that the reservation states of the primary and secondary devices are synchronized prior to reporting the change of relationship state to the host.

As noted above, in a synchronous mirror relationship, there may be multiple secondary volumes, each of which may be controlled by a secondary storage controller, such that the primary volume is in a one to many (multi-target) relationship. Accordingly, the operations of FIGS. 7 and 8 may be repeated for each secondary device of a multi-target relationship.

As noted above, in one embodiment, each storage controller 4a, 4b . . . 4n of each data storage system 2a, 2b . . . 2n, respectively, includes device reservation logic 28 (FIG. 6) for device reservation state synchronization in accordance with the present description. Accordingly, operations as described herein in connection with the device reservation logic 28 may be performed by one or more of the device reservation logic 28 of the primary and secondary storage controllers, either alone or in combination, depending upon the particular application.

In another aspect of the present description, the device reservation logic is configured to propagate device reservations of a primary device to each of the secondary devices in a single or multi-target synchronous mirror relationship. In propagating a reservation state from the primary device to the secondary device of a single primary-secondary pair of a relationship or to each secondary device of multiple one to many primary-secondary pairs of a multi-target mirror relationship, each secondary device eventually assumes the same reservation state as the primary device when the propagation is complete. However, until the propagation is complete, the reservation state synchronization logic 612 (FIG. 6) is configured to suspend other reservation state changing until the reservation state propagation is complete. The suspension is applicable in all environments but is especially applicable when there are multiple secondary volumes associated with a single primary device in a multi-target mirror relationship.

Figure 9:
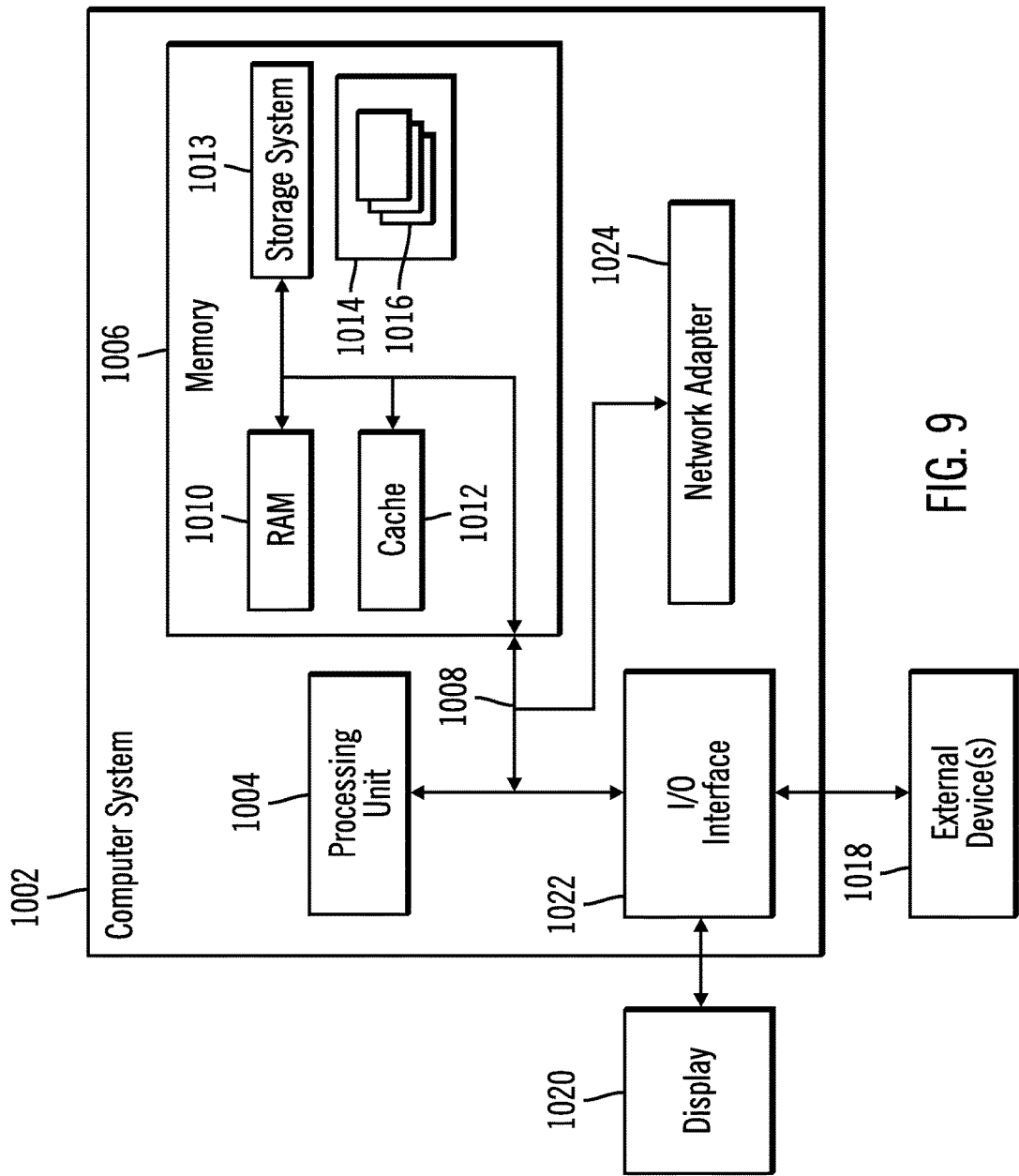
FIG. 9 illustrates a computer embodiment employing device reservation state synchronization in accordance with one aspect of the present description.

The computational components of the figures may each be implemented in one or more computer systems, such as the computer system 1002 shown in FIG. 9. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server 1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for use with at least one host, a primary data storage system, the primary data storage system having a primary storage controller and a primary storage drive controlled by the primary storage controller, the primary storage drive having a primary device configured to store data, and at least one secondary data storage system, each secondary data storage system having a secondary storage controller and a secondary storage drive controlled by the secondary storage controller, the secondary storage drive having a plurality of secondary devices configured to store data, wherein the computer program product comprises a computer readable storage medium having program instructions embodied therewith, the program instructions executable by a processor of a host to cause processor operations, the processor operations comprising:

relationship state detection logic detecting a change in relationship state of a synchronous mirror relationship between a primary device controlled by a primary storage controller, and at least one secondary device controlled by at least one secondary storage controller; and reservation state synchronization logic, in response to detecting a change in relationship state, determining if a reservation state of the primary device is synchronized with respect to a reservation state of a secondary device of the synchronous mirror relationship as a function of a comparison of the reservation states of the primary device and the at least one secondary device, and synchronizing the reservation states of the primary device and the at least one secondary device if determined to be out of synchronization.

2. The computer program product of claim 1 wherein the operations further comprise reporting by the relationship state detection logic, the change in state of the synchronous mirror relationship to a host after synchronizing reservation states of the primary and secondary devices to ensure that the reservation states of the primary and secondary devices are synchronized prior to reporting the change of relationship state to the host.

3. The computer program product of claim 1 wherein determining if a reservation state of the primary device is synchronized with respect to a reservation state of at least one secondary device includes determining the reservation state of the primary device and determining the reservation state of the at least one secondary device and comparing the determined reservation states of the primary and the at least one secondary device to determine if the determined reservation states of the primary and the at least one secondary device match wherein if the determined reservation state of the primary device matches the determined reservation state of the at least one secondary device, the reservation states of the primary and the at least one secondary device are determined to be synchronized and wherein if the determined reservation state of the primary device does not match the determined reservation state of the at least one secondary device, the reservation states of the primary and the at least one secondary device are determined to be out of synchronization.

4. The computer program product of claim 3 wherein relationship state detection logic in detecting a change in relationship state detects completion of data synchronization of the primary device and the at least one secondary device, and wherein synchronizing the reservation states includes overriding any existing reservation state of the at least one secondary device to match the reservation state of the primary device prior to reporting completion of data synchronization to full duplex status.

5. The computer program product of claim 3 wherein synchronizing the reservation states includes if the reservation state of the at least one secondary device is determined to be reserved and the reservation state of the primary device is determined to be not reserved, releasing the reservation state of the at least one secondary device to a not reserved state.

6. The computer program product of claim 4 wherein synchronizing the reservation states includes, if reservation state of the primary device is determined to be reserved to a first host and the reservation state of the at least one secondary device is determined to be reserved to a second host different from the first host, overriding the reservation of the at least one secondary device to the second host, and reserving the secondary device to the first host so that the reservation state of the secondary device becomes reserved to the same host as that of the reserved primary device.

7. The computer program product of claim 4 wherein synchronizing the reservation states includes, if reservation state of the primary device is determined to be reserved to a first host and the reservation state of the at least one secondary device is determined to be not reserved to any host, reserving the at least one secondary device to the first host so that the reservation state of the at least one secondary device becomes reserved to the first host.

8. The computer program product of claim 1 wherein the operations further comprise:

device reservation logic propagating a reservation state from the primary device to the at least one secondary device so that the at least one secondary device assumes the same reservation state as the primary device upon completion of the propagation; and reservation state synchronization logic suspending other reservation state changing until the reservation state propagation is complete.

9. A method, comprising:

relationship state detection logic detecting a change in relationship state of a synchronous mirror relationship between a primary device controlled by a primary storage controller, and at least one secondary device controlled by at least one secondary storage controller; and reservation state synchronization logic, in response to detecting a change in relationship state, determining if a reservation state of the primary device is synchronized with respect to a reservation state of a secondary device of the synchronous mirror relationship as a function of a comparison of the reservation states of the primary device and the at least one secondary device, and synchronizing the reservation states of the primary device and the at least one secondary device if determined to be out of synchronization.

10. The method of claim 9 further comprising reporting by the relationship state detection logic, the change in state of the synchronous mirror relationship to a host after synchronizing reservation states of the primary and secondary devices to ensure that the reservation states of the primary and secondary devices are synchronized prior to reporting the change of relationship state to the host.

11. The method of claim 9 wherein determining if a reservation state of the primary device is synchronized with respect to a reservation state of at least one secondary device includes determining the reservation state of the primary device and determining the reservation state of the at least one secondary device and comparing the determined reservation states of the primary and the at least one secondary device to determine if the determined reservation states of the primary and the at least one secondary device match wherein if the determined reservation state of the primary device matches the determined reservation state of the at least one secondary device, the reservation states of the primary and the at least one secondary device are determined to be synchronized and wherein if the determined reservation state of the primary device does not match the determined reservation state of the at least one secondary device, the reservation states of the primary and the at least one secondary device are determined to be out of synchronization.

12. The method of claim 11 wherein relationship state detection logic in detecting a change in relationship state detects completion of data synchronization of the primary device and the at least one secondary device, and wherein synchronizing the reservation states includes overriding any existing reservation state of the at least one secondary device to match the reservation state of the primary device prior to reporting completion of data synchronization to full duplex status.

13. The method of claim 11 wherein synchronizing the reservation states includes if the reservation state of the at least one secondary device is determined to be reserved and the reservation state of the primary device is determined to be not reserved, releasing the reservation state of the at least one secondary device to a not reserved state.

14. The method of claim 12 wherein synchronizing the reservation states includes, if reservation state of the primary device is determined to be reserved to a first host and the reservation state of the at least one secondary device is determined to be reserved to a second host different from the first host, overriding the reservation of the at least one secondary device to the second host, and reserving the secondary device to the first host so that the reservation state of the secondary device becomes reserved to the same host as that of the reserved primary device.

15. The method of claim 12 wherein synchronizing the reservation states includes, if reservation state of the primary device is determined to be reserved to a first host and the reservation state of the at least one secondary device is determined to be not reserved to any host, reserving the at least one secondary device to the first host so that the reservation state of the at least one secondary device becomes reserved to the first host.

16. The method of claim 9 further comprising:
device reservation logic propagating a reservation state from the primary device to the at least one secondary device so that the at least one secondary device assumes the same reservation state as the primary device upon completion of the propagation; and
reservation state synchronization logic suspending other reservation state changing until the reservation state propagation is complete.

17. A system for use with at least one host, comprising:
a primary data storage system, the primary data storage system having a primary storage controller and a primary storage drive controlled by the primary storage controller, the primary storage drive having a plurality of primary devices configured to store data; and
at least one secondary data storage system, each secondary data storage system having a secondary storage controller and a secondary storage drive controlled by the secondary storage controller, the secondary storage drive having a plurality of secondary devices configured to store data;
wherein at least one of the primary and secondary storage controllers includes device reservation logic which includes:
relationship state detection logic configured to detect a change in relationship state of a synchronous mirror relationship between a primary device controlled by a primary storage controller, and at least one secondary device controlled by the at least one secondary storage controller; and
reservation state synchronization logic, configured to, in response to the relationship state detection logic detecting a change in relationship state, determine if a reservation state of the primary device is synchronized with respect to a reservation state of a secondary device of the synchronous mirror relationship as a function of a comparison of the reservation states of the primary device and the at least one secondary device, and synchronize the reservation states of the primary device and the at least one secondary device if determined to be out of synchronization.

18. The system of claim 17 wherein the relationship state detection logic is further configured to report the change in state of the synchronous mirror relationship to a host after synchronizing of reservation states of the primary and secondary devices by the reservation state synchronizing logic, to ensure that the reservation states of the primary and secondary devices are synchronized prior to reporting the change of relationship state to the host.

19. The system of claim 17 wherein configuration of the reservation state synchronizing logic to determine if a reservation state of the primary device is synchronized with respect to a reservation state of at least one secondary device, includes being configured to determine the reservation state of the primary device and determine the reservation state of the at least one secondary device and compare the determined reservation states of the primary and the at least one secondary device to determine if the determined reservation states of the primary and the at least one secondary device match wherein if the determined reservation state of the primary device matches the determined reservation state of the at least one secondary device, the reservation states of the primary and the at least one secondary device are determined to be synchronized and wherein if the determined reservation state of the primary device does not match the determined reservation state of the at least one secondary device, the reservation states of the primary and the at least one secondary device are determined to be out of synchronization.

20. The system of claim 19 wherein configuration of the relationship state detection logic to detect a change in relationship state includes being configured to detect completion of data synchronization of the primary and the at least one secondary device, and wherein the configuration of the reservation state synchronizing logic to synchronize the reservation states includes being configured to override any existing reservation state of the at least one secondary device to match the reservation state of the primary device prior to the relationship state detection logic reporting completion of data synchronization to full duplex status.

21. The system of claim 19 wherein configuration of the reservation state synchronizing logic to synchronize the reservation states includes being configured to, if the reservation state of the at least one secondary device is determined to be reserved and the reservation state of the primary device is determined to be not reserved, release the reservation of the at least one secondary device to a not reserved state.

22. The system of claim 20 wherein configuration of the reservation state synchronizing logic to synchronize the reservation states includes being configured to, if reservation state of the primary device is determined to be reserved to a first host and the reservation state of the at least one secondary device is determined to be reserved to a second host different from the first host, override the reservation of the at least one secondary device to the second host, and reserve the secondary device to the first host so that the reservation state of the secondary device becomes reserved to the same host as that of the reserved primary device.

23. The system of claim 20 wherein configuration of the reservation state synchronizing logic to synchronize the reservation states includes being configured to, if the reservation state of the primary device is determined to be reserved to a first host and the reservation state of the at least one secondary device is determined to be not reserved to any host, reserve the at least one secondary device to the first host so that the reservation state of the at least one secondary device becomes reserved to the first host.

24. The system of claim 17 wherein:
the device reservation logic is configured to propagate a reservation state from the primary device to the at least one secondary device so that the at least one secondary device assumes the same reservation state as the primary device; and
the reservation state synchronization logic is further configured to suspend other reservation state changing until the reservation state propagation is complete.

* * * * *